(12) United States Patent
Caprioli

(10) Patent No.: US 10,362,773 B2
(45) Date of Patent: Jul. 30, 2019

(54) AUTOMATIC RETRACTABLE FLOAT

(71) Applicant: RETRACT A FLOAT PTY LTD, Townsville (AU)

(72) Inventor: Evandro Venanzi Beradino Caprioli, Townsville (AU)

(73) Assignee: RETRACT A FLOAT PTY LTD., Townsville (AU)

(*) Notice: Subject to any disclaimer, the term of this patent is extended or adjusted under 35 U.S.C. 154(b) by 141 days.

(21) Appl. No.: 14/900,812

(22) PCT Filed: Jun. 23, 2014

(86) PCT No.: PCT/AU2014/000651
§ 371 (c)(1),
(2) Date: Dec. 22, 2015

(87) PCT Pub. No.: WO2014/205482
PCT Pub. Date: Dec. 31, 2014

(65) Prior Publication Data
US 2016/0135439 A1 May 19, 2016

(30) Foreign Application Priority Data
Jun. 24, 2013 (AU) .................. 2013902306

(51) Int. Cl.
A01K 75/04 (2006.01)
B63B 22/18 (2006.01)
(Continued)

(52) U.S. Cl.
CPC ............. A01K 75/04 (2013.01); B63B 22/18 (2013.01); B63B 22/24 (2013.01); G01S 19/13 (2013.01); H02S 10/40 (2014.12)

(58) Field of Classification Search
CPC .......... A01K 75/04; B63B 22/18; B63B 22/24
(Continued)

(56) References Cited

U.S. PATENT DOCUMENTS 3,005,215 A 10/1961 Colt et al.
4,077,076 A 3/1978 Masters
(Continued)

FOREIGN PATENT DOCUMENTS

AU 2012101776 1/2013
CA 2088088 A1 7/1994
GB 2246103 A 1/1992

OTHER PUBLICATIONS

Supplemental European Search Report in corresponding European application No. EP14818211, dated Nov. 11, 2016, 10 pp.
(Continued)

Primary Examiner — Darren W Ark
Assistant Examiner — Brady W Frazier
(74) Attorney, Agent, or Firm — Tredecim LLC; Sean L. Sweeney; Taylor A. Noonan

(57) ABSTRACT

The invention relates to an automatic retractable float for use with a crab net including a body which floats in water and an automatic retraction and extension mechanism for automatically extending and retracting line from the body. In use the line is attached to the crab net, the crab net deployed and the body floats when in water towards the surface of the water. The automatic extension and retraction mechanism causes the line to be extended and retracted between the body on the surface of the water and the crab net, substantially keeping the line taut to help prevent tangling. The invention also relates to a method of use.

8 Claims, 3 Drawing Sheets

(51) Int. Cl.
*B63B 22/24* (2006.01)
*H02S 10/40* (2014.01)
*G01S 19/13* (2010.01)

(58) Field of Classification Search
USPC .... 43/8, 43.11; 441/1, 6, 11, 21, 23, 24, 25, 441/26
See application file for complete search history.

(56) References Cited

U.S. PATENT DOCUMENTS

| | | | | |
|---|---|---|---|---|
| 4,405,303 | A | | 9/1983 | Smith |
| 4,406,083 | A | * | 9/1983 | Hart ................ A01K 69/06 43/105 |
| 4,644,682 | A | * | 2/1987 | Cloud ............... A01K 75/04 43/100 |
| 4,781,636 | A | * | 11/1988 | Schurr ................ B63B 22/18 242/395 |
| 5,067,920 | A | * | 11/1991 | Brisky ................ B63C 11/26 114/315 |
| 5,173,067 | A | * | 12/1992 | Biba .................. B63C 11/26 242/156 |
| 5,376,035 | A | * | 12/1994 | Forrest ............... B63B 22/18 242/390.8 |
| 5,408,238 | A | | 4/1995 | Smith |
| 5,449,308 | A | * | 9/1995 | Thompson .......... B63B 22/08 242/390.8 |
| 5,588,889 | A | | 12/1996 | Easter |
| 5,640,922 | A | | 6/1997 | Fieldcamp et al. |
| 5,782,663 | A | * | 7/1998 | Van Raden ......... B63B 22/18 441/25 |
| 5,803,780 | A | * | 9/1998 | Gutierrez, Jr. ....... B63B 22/18 43/43.1 |
| 5,865,656 | A | * | 2/1999 | Sims ................. B63B 22/04 441/25 |
| 5,947,780 | A | | 9/1999 | Kellner et al. |
| 5,966,861 | A | * | 10/1999 | Authement ......... A01K 75/04 43/44.9 |
| 6,086,439 | A | * | 7/2000 | Vasile ............... B63B 22/00 441/25 |
| 6,093,069 | A | | 7/2000 | Schelfhout |
| D440,171 | S | | 4/2001 | Berger-North et al. |
| 6,383,045 | B1 | | 5/2002 | Eckardt |
| 7,175,492 | B1 | * | 2/2007 | Butler ............... B63B 22/04 441/26 |
| 7,450,471 | B1 | * | 11/2008 | Schlegg ............. B63C 11/26 367/131 |
| 7,455,257 | B1 | * | 11/2008 | Kaleta .............. B63C 11/02 242/397.3 |
| 7,828,494 | B1 | | 11/2010 | Reynolds et al. |
| 2002/0140599 | A1 | * | 10/2002 | King ................ B63C 11/26 342/357.57 |
| 2003/0040235 | A1 | * | 2/2003 | Charte .............. B63C 9/00 441/23 |
| 2008/0251000 | A1 | * | 10/2008 | Blakesley .......... B63B 21/00 114/293 |
| 2009/0239427 | A1 | | 9/2009 | Purgavie et al. |
| 2011/0065342 | A1 | | 3/2011 | Hudson |
| 2014/0162509 | A1 | * | 6/2014 | Harrington ........ B63C 7/26 441/6 |

OTHER PUBLICATIONS

Switec Anchor Buoy Repair Manual, accessed at https://www.switec.com/en/ankerundbojen/30-self-adjusting-anchor-buoy-8436568320175.html and https://www.youtube.com/watch?v=nwXhTFZ2D3w; published on Mar. 28, 2013, 8 pp.

New Zealand Intellectual Property Office First Examination Report in corresponding NZ application No. 715984, Sep. 21, 2018, 5 pp.

* cited by examiner

AUTOMATIC RETRACTABLE FLOAT

FIELD OF THE INVENTION

The present invention relates to an automatic retractable float, and in particular to an automatic retractable float that substantially prevents tangling of the line in use, such as with a crab net.

BACKGROUND OF THE INVENTION

Catching crabs is a popular pastime in many countries around the world so as to be able to enjoy eating the crab meat. The usual method is to use a crab net with a secured bait of meat or fish inside to attract crabs into the trap. Once inside the design of the net prevents the larger crabs from escaping, trapping the crabs until removal.

Crab nets may be used on land such as in an estuary or mangrove, or directly in the sea, river or dam. The crab net may be deployed in shallow water close to mangroves on an incoming tide, for example, to be retrieved when the tide has receded again. Or the crab net may be taken in a boat to a suitable location out to sea, perhaps close to a reef, and deployed for retrieval later. When crab nets are to be left unattended it is usual to use a float or buoy to indicate the location of the crab net, with labels to identify the owner. Each net has its own float, usually made of STYROFOAM (trade mark) which is tied to a line tied to the crab net. When the crab net is put or dropped at a desired location the long length of line allows the crab net to fall under gravity to the bottom of the sea, and the float floats approximately above the crab net on the surface of the water to indicate the location of the crab net. As sea levels rise more of the line is needed as the float floats higher, away from the crab net, on the surface of the sea. As the tide recedes the water level drops and the float floats closer to the crab net, requiring less line. In this case the excess line falls under gravity towards the bottom, or the float moves around on the surface of the sea, away from the net. It is this long line that causes problems due to tangling of the line with itself and other objects.

Before deployment of the crab net each line may need to be untangled from itself and usually from other nets as multiple nets are usually deployed. A mess of tangled lines may occur when several fishers are sharing a boat and are deploying and retrieving their nets together. The loose line can tangle with the nets, other lines, and around pieces of equipment in the boat. As other boats pass the wash causes lines to move around and become tangled. The tangling is a serious safety issue as the fisher may trip or have their feet caught in the line. On deploying the net, if there is a large length of loose and uncontrolled line this can easily get caught around the propeller or other parts of the boat either before or during use. Clearly, line will jam the propeller and may immobilise the boat requiring rescue of the fishers. Health and safety in all environments is so important to reduce accidents and so it is most undesirable to have tangling lines loose during crab fishing.

When crabbing the environment is often inhospitable, such as in a mangrove where sand flies and mosquitos quickly find a person and attack. The attack of the sand flies and mosquitos is unpleasant and can lead to infection, but also puts the person at risk of serious illnesses such as dengue fever. It is therefore desirable to be able to deploy the net quickly and get out of the danger zone. Often the line when retrieved takes many minutes to untangle and wind up by hand and tie up so that it is organised for storage until next use. In areas where crabs can be found there is often the possibility of the presence of dangerous saltwater crocodiles, another very good reason not to linger at the location. Where a line has become wrapped around a mangrove sometimes the only way to free the line is to enter the water and try to pull the line off the obstruction. Again in crocodile infested waters or where other dangers lurk, entering the water is most undesirable. At the time all the person wants to do is to get out of the area as quickly as possible to go and enjoy the crab supper and maybe a cold beer after a good day fishing.

In commercial crab fishing the problem of tangled lines is compounded many times over. Before starting fishing 50 or more crab pot float lines must be checked and if possible untangled and where untangling is not possible the line cut and replaced, before use. The loss of time and materials due to tangled lines for commercial fishers using pots can have a significant result on their ultimate profitability.

The problem of tangled lines for crab nets is one encountered everyday by the millions of fishers around the world and yet no solution has been found. The inventor has known of this problem for many years and tried many different ways to find a solution, without success. The inventor has, through careful development and experimentation, developed an automatic retractable float for use with a crab net that solves the problem in an easy to use and manufacture manner. A considerable amount of time and inconvenience is saved by no longer needing to untangle the lines before and after fishing and to tie them up for transportation. It is anticipated that as soon as the invention is readily available that many people will want to replace their existing floats with these automatic retractable floats so as to avoid the main problem and inconvenience of crab fishing-tangled lines.

It would be highly desirable for there to be an improved float for use with a crab net or similar that includes an automatic retraction and extension mechanism to substantially avoid tangling during use.

The invention is described with reference throughout to use with a float for a crab net for catching crabs. The float can be used for other purposes, and is not limited to use with a crab net or pot except as limited in the claims and supporting paragraphs of the description. Use with a crab pot net or similar is a particularly useful application of the invention, to avoid tangling of lines when deploying or retrieving the pots and for this reason, and ease of description, the example of use with a crab pot is given. Nets suitable for other crustaceans, fish or seafood could equally be caught in the net by accident or design, for example in a lobster pot.

For clarity, any prior art referred to herein, does not constitute an admission that the prior art forms part of the common general knowledge, in Australia or elsewhere.

It is an object of the present invention to provide an automatic retractable float that at least ameliorates one or more of the aforementioned problems of the prior art.

DISCLOSURE OF THE INVENTION

Accordingly, the present invention provides an automatic retractable float for use with a crab net including:
 a body which floats in water; and
 an automatic retraction and extension mechanism associated with the body for automatically extending and retracting line from the body,
wherein, in use, the line can be attached to the crab net and the crab net deployed and the body floats when in water towards the surface of the water and the automatic extension and retraction mechanism causes the line to be extended and retracted between the body on the surface of the water and the crab net, substantially keeping the line taut to help prevent tangling.

Preferably, the crab net is a net adapted to have a fixed bait to attract crabs or the like into the net from which they cannot readily escape. The crab net may also be a crab pot, lobster pot, oyster frame or any other net for catching fish or seafood. The net may be used for catching fish for food, for use in aquaculture or for research purposes. The crab net may be used for hobby fishers or the crab net may be one of many crab nets used by commercial fishers.

The crab net may be replaced with any suitable object that it may be desired to deploy in water and mark the location with a float. The float of the invention may act as a buoy for any suitable purpose.

Preferably, the body is made of a lightweight material. The body may be made of any suitable material. The body may be made to include a hollow float chamber. The body may be made of plastics. The body may be made of wood, metal or a combination of suitable materials. The body may be made in two halves joined together during manufacture. Preferably, the body has strong flotation properties. Preferably, the body floats strongly in water and resists submersion. Preferably, in one form of the body is made of STYROFOAM (Trade Mark). In another form of the invention the invention includes a hollow body. The hollow body may be made of plastic. The hollow body may be made of a lightweight metal.

Preferably, the body is substantially spherical in shape. The body may take any suitable shape. The body may be a shape chosen from the group: cylindrical; cuboid; pyramidal; ovoid; or irregular shaped.

Preferably, the body includes a recess. The recess may take any suitable shape. Preferably, the recess is cylindrical. The recess may be a shape chosen from the group: cuboid; pyramidal; ovoid; or irregular shaped. Preferably, the recess is adapted to receive the retraction and extension mechanism therein. The recess may include reinforcement to act against wear during use. The reinforcement may be a thickening of the material of the body. The reinforcement may be a layer of plastic, metal or other suitable material.

The body may any suitable colour or include decoration to improve visibility. The body may include a reflective material. The body may include high visibility materials. The body may include branding or other distinctive colouring to distinguish from other floats or buoys. Bright colours may be used to facilitate seeing the float in the water for location and retrieval.

Preferably, a conduit is included adapted for receipt of the line to allow it to extend from within the body of the float. Preferably, the conduit is in communication with the recess of the body. Preferably, line is held within the recess during the retraction and can be extended from the recess to outside of the body through the conduit. Preferably, the conduit is a narrow cylindrical shape. The conduit may be a plastic tube. The conduit may be a narrow passage in the body which is reinforced. The reinforcement may be a thin layer of plastic, metal or other suitable material or a thickening of the material of the body.

Preferably, the automation is the automatic extension or retraction of line from the body of float 1. Preferably, the automation is the automatic extension or retraction of line from the body of float 1, without human intervention.

Preferably, the retraction is the retraction of the line from outside of the float to inside the body. Preferably, the retraction is retraction of the line into the recess of the body. Preferably, the extension is extension of the line from inside of the float to outside of the body. Preferably, the extension of the line is extension of line from the recess of the body to outside of the float.

Preferably, the retraction and extension mechanism includes a spring under tension. Preferably, the retraction and extension mechanism includes a spring bias to maintain the line wound around an axle. The retraction and extension mechanism may take any suitable form. Preferably, the line can move between a retracted state and a range of extended states. The retracted state is preferably where the line is fully wound on to the axle and maintained in that state by the biasing of the spring. The range of extended states may be slightly extended, partially extend to fully extended where all the line is extended. It is very unlikely in use that the line will be fully extended as excess line is included to avoid this occurrence. Preferably, the line extends a small distance from the body of the float in the retracted state to allow attachment to the crab net.

Preferably, in the retracted state the line is prevented from tangling. Preferably, in the retracted state most of the line is stored in the float and prevented from tangling. In the retracted state substantially all the line is stored in the float and prevented from tangling. Preferably, in the retracted state the float is capable of storage or transportation without tangling of the line.

Preferably, the extension of the line from the body of the float is by pulling on the line. Preferably, pulling on the line with sufficient tension overcomes the bias of the spring mechanism enabling line to extend from the body. Preferably, the floatation properties of the body are sufficient to create tension in the line to overcome the bias of the spring mechanism and extend the line between the floating body and the end of the line attached to the crab net. Alternative mechanisms may be used instead.

Preferably, the line is a cord or strong line suitable for deployment in water. The line may be made of any suitable material. The line may include colour coding to indicate the length of line. The length of line may be indicated my markings. The length of line may be indicated by colour changes every 1 meter or other suitable increment.

Preferably, the line includes a fastener at one end for attachment to the crab net. The fastener may take any suitable form. The fastener may be a clip that can be readily attached and detached from the crab net but maintains the line secured to the crab net during use. The clip may be a metal clip. The clip may be made of any suitable material including stainless steel.

The float may include a global positioning system "GPS" device. The GPS device may be a GPS transmitter. The float may include a battery and printed circuit board adapted to provide power to the GPS device or transmitter. The float may include a solar panel. The solar panel may charge a rechargeable battery. The solar panel may power the GPS device or transmitter. Preferably, a mobile phone application can be used to locate the float through use of GPS. Other electronic devices may be included used with the float.

Preferably, a light is included. The light may be a light emitting diode LED array. The light may be powered by a battery. The light may be powered by a solar panel.

Accordingly, the present invention provides in a further variant an automatic retractable crab net and float including:
a crab net;
a float body which floats in water; and
an automatic retraction and extension mechanism associated with the float body for automatically extending and retracting the line from the body, wherein, in use, the line is attached to the crab net and the crab net deployed and the body floats when in water towards the surface of the water and the automatic extension and retraction mechanism causes the line to be extended and retracted between the body on the surface of the water and the crab net, keeping the line substantially taut and to assist to prevent tangling of the line.

Accordingly, the invention also provides a method of using a crab net float, the float including a body and retraction and extension mechanism for a line, the method including the steps of:
  a) attaching the float to the crab net;
  b) deploying at a suitable location;
  c) retrieving the float and crab net after time, wherein during deployment the line automatically extends between the float, floating on the surface of the water, and the crab net and on retrieval the line automatically retracts within the float, substantially avoiding tangling of the line.

The method may include the further step of:
  d) storing the float with retracted line for future use.

INDUSTRIAL APPLICABILITY

The automatic retractable float of the invention can be readily manufactured and supplied, assembled or in partially assembled form, direct to customers or to retail outlets for sale.

BRIEF DESCRIPTION OF THE DRAWINGS

The invention will now be described in connection with a non-limiting preferred embodiment with reference to the accompanying drawings, in which:

DETAILED DESCRIPTION OF THE
INVENTION INCLUDING A BEST MODE

Figure 1:
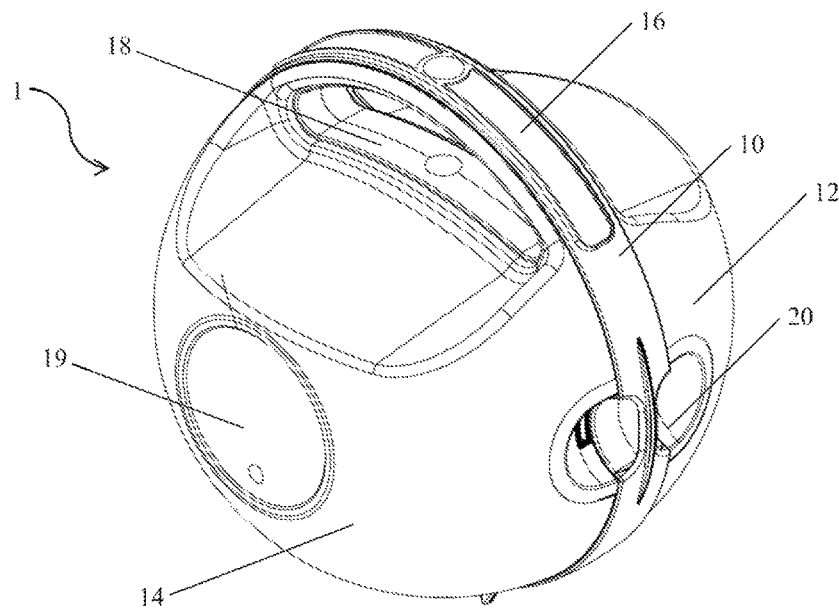
Figure 2:
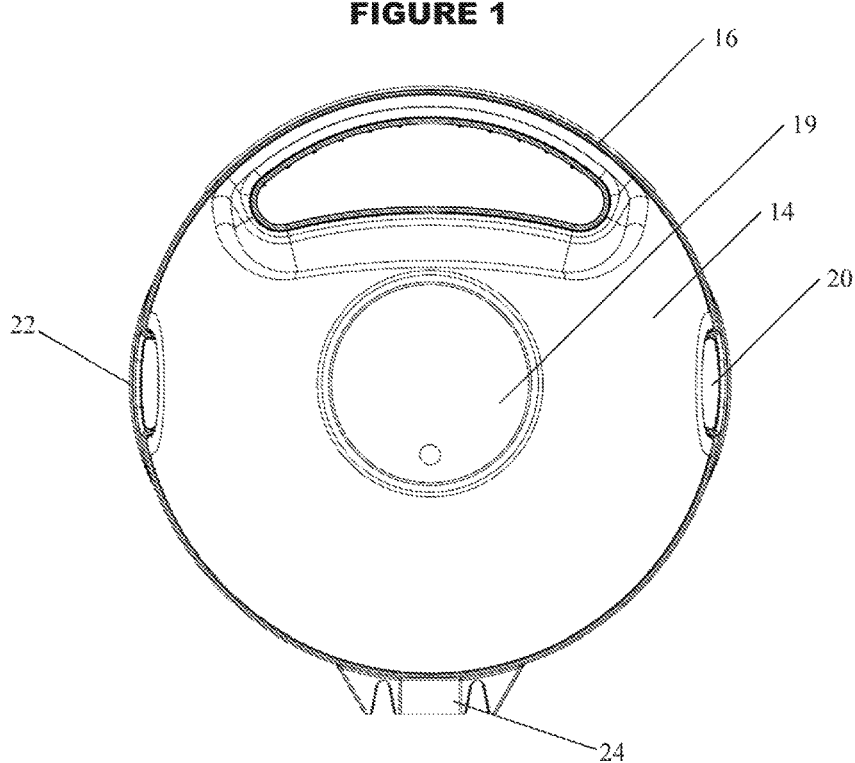
Figure 3:
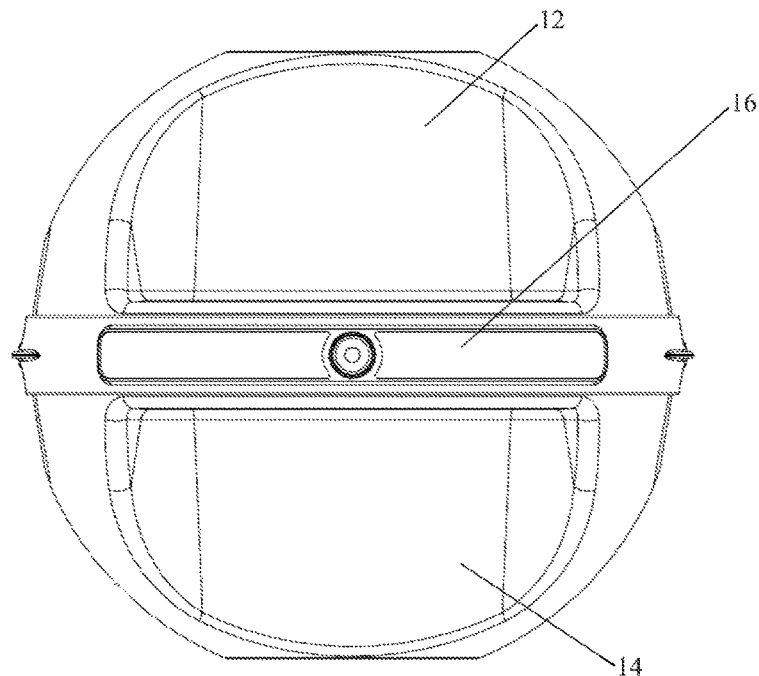
Figure 4:
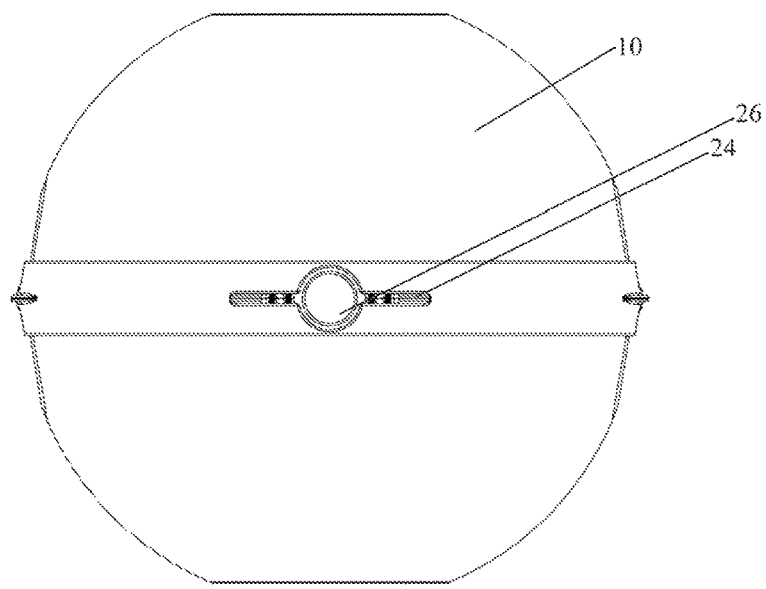
Figure 5:
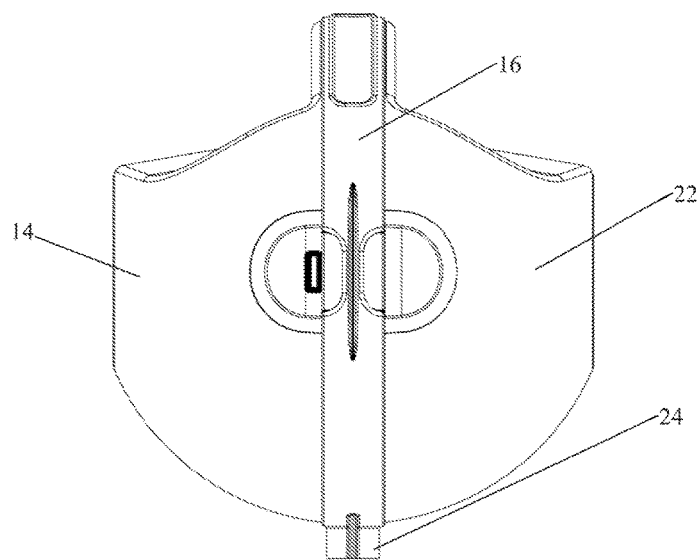
Figure 6:
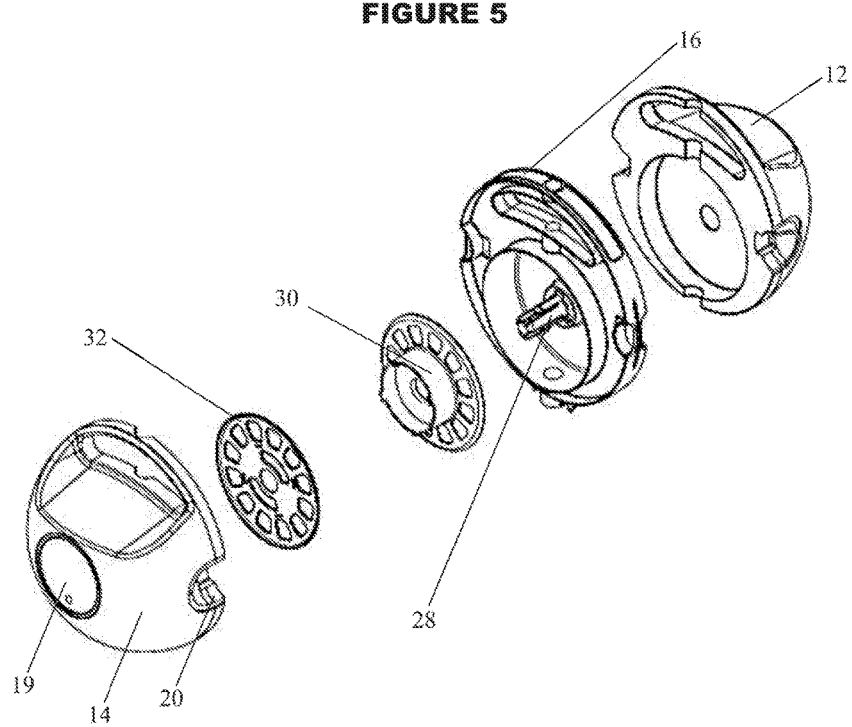

FIG. 1 is a perspective view from the front of an automatic retractable float according to a preferred embodiment of the invention;

FIG. 2 is a view from the front of the automatic retractable float of FIG. 1;

FIG. 3 is a view from above of the automatic retractable float of FIGS. 1 and 2;

FIG. 4 is a view from below of the automatic retractable float of FIGS. 1 to 3;

FIG. 5 is a view from the side of the automatic retractable float of FIGS. 1 to 4; and FIG. 6 is an exploded view of auto retractable float of FIGS. 1 to 5.

Referring to FIGS. 1 and 6, a preferred embodiment of the invention will be described, where automatic retractable crab net float 1 has body 10 from which a line would extend and retract in use from the crab net. The line is omitted from the drawings for ease of illustration, as is the attached crab net.

Body 10 is a hollow sphere, to create a floating body, made of two halves labelled 12 and 14 attached to handle 16 of central portion 18. All of body 10, halves 12 and 14 and handle 16 and central portion 18 are made from a suitable hard plastics material. Halves 12 and 14 fit together with a press fit to central portion 18. The particular shape of body 10 is convenient, however other shapes could be used instead. Body 10 as illustrated is a white colour to make float 1 easy to see and retrieve, such as from the sea. Alternatively, body 10 may be made of a high visibility material, reflective material, or bright colour to make float 1 easy to find and retrieve after deployment. Body 10 may be formed with a decorative pattern or other combination of colours. The particular colour of body 1 may be varied to suit the desires of the user and the particular application of float 1. Body 10 may be made available in a range of colours and the different colours can indicate different positions or types of net, for example.

Body 10 may include a solar power generating coating or panel to provide power to devices used within the float, in one form of the invention. In particular a miniature solar panel may be included attached to a rechargeable power source such as a battery to enable power to be provided to a GPS or radio transmitter. The solar panel and or batteries may also be used to power other electronic devices such as a Light Emitting Diode ("LED") array.

Body 10 includes front and back depressions 19, and side depressions 20 and 22. The particular form of depressions 19, 20 and 22 can be changed as these facilitate handling of body 10. Line housing 24 has conduit 26 for housing the line allowing extending and retracting. The line used is finely woven rope which is very malleable and kink resistant as is useful to the invention. However, other ropes, threads, cords or plastic wire or rope could be used in an alternative form of the invention. A metal wire covered in plastic to resist the action of sea water may be used in one form of the invention, for example.

The line is a long length of line, suitable to be used in coastal waters, mangroves or the like where there is a decent tidal movement between low tide and high tide. In the illustrated example 6 meters of line are included as is suitable for use in North Queensland coastal waters. Clearly, the particular length of line can be varied to suit the use to be made of float 1. For example, in the sea the length of line needs to be fairly long, 20 meter or more where there is a significant tidal movement or 10 meters in shallower waters.

Body 10 as illustrated is a hollow spherical shape as is suitable to house the extending and retracting mechanism as described further below. Body 10 includes a recess (not labelled) within which the extending and retracting mechanism sits, in communication with the conduit 26 through which the line extends and retracts. The air in the recess and hollow body 10 will strongly assist floatation in fluid such as water. Body 10 may also be formed of a foam or other material with strong floatation properties.

Conduit 26 is a hollow cylindrical shape, in communication between the recess and extending and retracting mechanism and the outer surface of body 10. Conduit 26 is very narrow just bigger than the width of the line to prevent water entering the recess. The outer surface of the recess and conduit 26 are reinforced with a plastic layer to prevent wear and tear. The reinforcement could be omitted or replaced with alternative means, where different materials are used for body 10.

The line is attached to spring mechanism 28 including a tensioned biasing spring on an axle around which line is wrapped during manufacture. The spring is biased to the retracted and wound up state unless further tension is applied, such as by pulling on the other end of the line. The end of the line attached to spring mechanism 28 is wound very tightly around the axle in the retracted state. As a person pulls on the line the tension applied acts on spring mechanism 28 enabling line 12 to be automatically extended from body 10 through conduit 26. When the tension is removed by the person letting go, for example, spring mechanism 28 is biased to act against the extension and winds the line automatically back on to the axle. Therefore, where the float is on the top of the water and the crab pot attached below as the tension decreases with the receding tide the line becomes slack and so is returned to the axle of spring mechanism 28, whereby the line is shortened and returned to a state of tension. Similarly, when the tide rises the increase in tension between the float body 10 which wishes to remain on the surface of the water and the crab pot below puts tension on the line allowing more line to extend providing a longer line between the crab net and the float and maintaining the tension. As exactly the correct amount of line is available at any one time there is not an excess of line floating around and getting tangled—a fantastic improvement over the prior art.

Spool parts 30 and 32, as can be seen in particular in FIG. 6 fit together to form the central spool within which the line is wound, in response to the biasing spring mechanism 28. Spool parts 30 and 32 can be seen to form a cover for the line wound around the axle of the spring mechanism before exiting through conduit 26. The particular form of body 10 and the surrounding parts is less important than the core of the invention, through use of the spring mechanism to extend and retract the line from float 1.

The line is provided in different colours, each meter being a different colour so that on extension it can easily be seen the distance of line extended. The colour coding could be replaced with incremental measures on the line or other form of indication of the length of line deployed. The colour coding may be designed to be seen underwater and may assist to determine the depth of water where the crab pot is deployed.

Not shown is use of a clip at end of the line including a clasp threaded through a loop secured to an end of the line by an end cap. The clip is used to readily attach and detach to a crab net or the like by using the clasp to secure to a metal part of the net. The clasp, loop and end cap are all made of stainless steel, but other suitable metals or strong materials could be used instead.

In use, a person will take nets to be deployed to a suitable location. The location may be by boat out to sea, by foot to a suitable rock formation or to a mangrove. Once at the suitable location the nets to be deployed are baited with fish or meat, such as chicken bones with the bait being strongly secured within the nets. The person then attaches float 1 by use of quickly clipping the clasp of the clip to the metal frame of the net. Float 1 before use is in the retracted state with spring mechanism 28 strongly biased to keep the line tightly wound within the recess of body 10. The person can pull on the line to extend or pull a short length of line out if necessary before attachment to the net or attach directly with the line in the fully retracted state. In either circumstance the line is kept well controlled and untangled. This compares to the usual state of affairs where a long line needs to be untied and loosed to avoid tangling on deployment. There are usually 4 nets or more to be deployed and so the overlapping long lines can easily get in a tangle, delaying setting of the nets and moving on. Further, where long loose lines are used and there are several fishers together there is a serious safety issue, as the lines may tangle around the feet of the fishers, the propeller of the boat or other equipment. Fishing, particularly in tropical waters, can be a dangerous business and entering the water is not just inconvenient but could be life threatening. Hence the loose lines and associated safety issues are a serious problem without use of the subject invention.

With float 1 attached to the net the net is dropped and positioned so as to sit on the bottom of the waterway. Due to the restraint of the line by spring mechanism 28 there is no risk of tangling with any objects or with the propeller of the boat. This may be to drop in water to fall to the sea bed and in this case the gravity of the baited net will pull on the line overcoming the biasing action of spring mechanism 28 to extend the line. At the other end of the line the floatation properties of body 10 causes body 10 to be maintained floating of the surface of the water so tension is created in the line between body 10 on the surface of the water and the net on the sea bottom. The tension in the line enables body 10 to remain on the surface of the water, visible to indicate that the net lies below so the person can see it and retrieve it later. As the tide rises the distance between body 10 on the surface of the water and the net on the bottom increases and the line extends due to the pull to overcome the bias of spring mechanism 28. As the tide recedes the distance between body 10 of float 1 and the net decreases. With conventional floats the long length of line then is free to float around in the sea and tangles with itself, the net or other debris. The difference with the subject invention is as the distance between the surface and the net decreases spring mechanism 28 retracts the excess line to wind it back on the axle, preventing tangles. On retrieval the person can see float 1 on the surface and pull up the net below to check for crabs. Any crabs that have entered the net after the bait should be unable to get out if they are of a suitable size and can be removed for consumption or sale. The clip can then be readily removed from the net and the net either reset with bait or put aside for storage. On removal of the tension and weight of the net on line, spring mechanism 28 biases the line to wind back in around the axle. Float 1 then is fully retracted with no loose line that can be tangled, with objects, mangrove roots or the propeller of the boat. There is no need to untangle or tie up lines, this dramatically improves the speed and efficiency of use of the crab nets and removes a significant problem with crab netting allowing fishers to enjoy the activity far more, and hopefully have greater efficiency and success.

Another deployment method may be to put the net in shallow water, such is in a tidal creek or mangrove before high tide. In this case float 1 is attached by the clip to the upper part of the net as before in the fully retracted state. As the tide rises the flotation properties of body 1 create tension on the line causing the bias of spring mechanism 28 to be overcome, extending the line so that body 10 floats on the surface of the water. As the water rises the length of the line readily extends to maintain float 1 on the surface above the net. As the tide recedes to the shallows again spring mechanism 28 bias the line to wind back in on the axle preventing there being excess line lying around that could become tangled. Retrieval from the shallows is much easier as there is not a mess of line to detangle and tie up to remove, usually while fighting with sand flies and mosquitoes. Instead float 1 is retracted so the net can be picked up and the person can leave the area quickly.

Float 1 includes a global positioning system "GPS" locator (not shown) within body 10 which is accessible by mobile phone so the user can track the location of float 1. This may be particularly useful for commercial fishers or after high seas to locate lost nets and floats. A printed circuit board and a rechargeable battery (neither shown) are included and these provide power to the GPS locator so that the message can be detected by the GPS satellite and forwarded to the user, such as by mobile phone.

A solar panel (not shown) is included on the outside of body 10 with a small inverter connected to the battery and printed circuit board within body 10 to provide power. The solar panel can recharge the battery so that there is no interruption of power to the GPS transmitter.

A light emitting diode "LED" light array is included in body 10 to assist the user to find float 1 in the dark or low light environments. The number and colours of the LEDs can be varied to suit the user's requirements. For example, for deployment in rough seas a stronger light will be required to calm coastal waters at dusk. Power for the LEDs are provided by the battery on the printed circuit board. The light is permanently on but could include switches to switch between on, off and high and low setting to use different numbers of LEDs in the array, if desired.

The automatic retractable float subject of the application is a useful item, that improves safety and convenience for both hobby and commercial fishers. There is no need for the fisher to make complex adjustments or settings, the automatic retractable float reacts to the need to extend or retract the length of line between the surface and the crab pots and solves the problem with a readily manufactured and economic solution.

The inventor has developed a surprisingly efficient and effective means of dealing with a serious problem for crab fishers. The problem has existed for more than a century and no satisfactory solution has been developed. The present invention has solved this problem that others have attempted to solve, but have not been successful.

It will be apparent to a person skilled in the art that changes may be made to the embodiment disclosed herein without departing from the spirit and scope of the invention in its various aspects.

REFERENCE SIGNS LIST

| | |
|---|---|
| 1 | Automatic retractable float |
| 10 | Body |
| 12 | First half of body 10 |
| 14 | Second half of body 10 |
| 16 | Handle |
| 18 | Central part |
| 19 | Depression (front and back) |
| 20 | Depression |
| 22 | Depression |
| 24 | Line housing |
| 26 | Conduit |
| 28 | Spring mechanism |
| 30 | Spool part |
| 32 | Spool part |

The invention claimed is:

1. An automatic retractable float comprising:
a body which floats in water;
the body comprising two halves connected to a central portion;
the central portion having a top handle, a pair of side handles and a line housing disposed about the outer surface, with a depression located under each side handle,
wherein about the outer surface of the central portion the line housing is positioned substantially opposite the top handle and the side handles are positioned substantially opposite each other such that each side handle is approximately midway between the top handle and the line housing and
wherein the line housing includes a conduit that passes through the outer surface of the central portion and provides access to an interior of the body;
each of the two halves having a pair of depressions positioned such that when each half is attached to the central portion, the pair of depressions are joined with the corresponding depression under each side handle;
an automatic retraction and extension mechanism contained within the interior of the body, the automatic retraction and extension mechanism including a spring mechanism for automatically extending and retracting a line from the body; and
at least one electronic device in communication with a mobile device such that the electronic device shares information or data with the mobile device.

2. The automatic retractable float of claim 1, wherein the automatic retraction and extension mechanism is secured to the central portion.

3. The automatic retractable float of claim 1, wherein each half includes a third depression positioned such that each third depression is positioned substantially opposite the other third depression when the two halves are secured to the central portion.

4. The automatic retractable float of claim 1, wherein the electronic device provides at least one of location information and identification information of the automatic retractable float.

5. The automatic retractable float of claim 4, wherein the electronic device is a Global Positioning System providing information about the identity and location of the automatic retractable float.

6. The automatic retractable float of claim 4, wherein at least one of identification information and location information of the automatic retractable float can be accessed on the mobile device.

7. The automatic retractable float of claim 1, wherein the electronic device includes a solar power system.

8. The automatic retractable float of claim 7, wherein the solar power system provides power to a global positioning system to provide identification and location information of the automatic retractable float, receivable on a mobile device.

* * * * *